J. B. GATHRIGHT.
Back-Band Hooks.

No. 8,227. Reissued May 14, 1878.

Attest:

G. F. Greenbaum
H. P. Gillock.

Inventor:

Josiah B. Gathright

N. PETERS, PHOTO-LITHOGRAPHER, WASHINGTON, D. C.

UNITED STATES PATENT OFFICE.

JOSIAH B. GATHRIGHT, OF LOUISVILLE, KENTUCKY.

IMPROVEMENT IN BACK-BAND HOOKS.

Specification forming part of Letters Patent No. 148,606, dated March 17, 1874; Reissue No. 8,227, dated May 14, 1878; application filed November 12, 1877.

*To all whom it may concern:*

Be it known that I, JOSIAH B. GATHRIGHT, of the city of Louisville, State of Kentucky, have invented new and useful Improvements in Combined Hooks and Buckles for Back-Bands and similar uses, of which the following is a correct specification, the accompanying drawings being a part of the same.

The object of my invention is to provide a combined hook and buckle for back-bands and similar uses which shall be simpler and cheaper in form and construction and more advantageous in use than those heretofore known.

Figure 1:
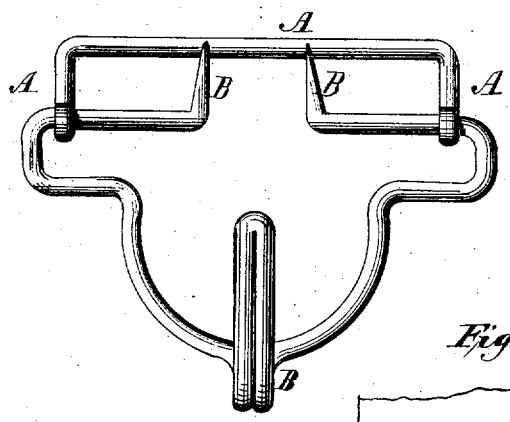
Figure 2:
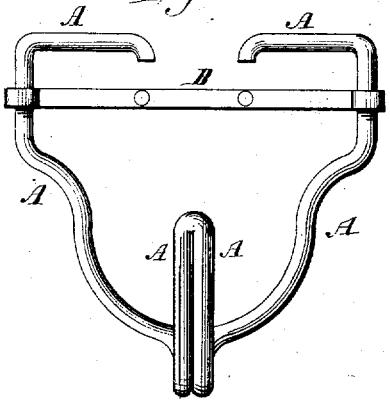

By reference to Figure 1 it will be seen that I have devised a simplicity of form and a method or plan of construction that enable me to construct a combined hook and buckle for back-bands and similar uses by simply bending two wires into suitable shape and connecting them together, as seen in Fig. 1. This is rendered feasible by dispensing with the lower parallel bar C in Fig. 3, (which figure illustrates the forms heretofore in use,) and so shaping and arranging the hook-supporting arms that they will perform the function heretofore performed by bar C. A form that dispenses with bar C also saves in metal and expense to that extent, and the sectional parallel bars B B, Fig. 1, and A A, Fig. 2, are also economical advantages.

Figure 3:
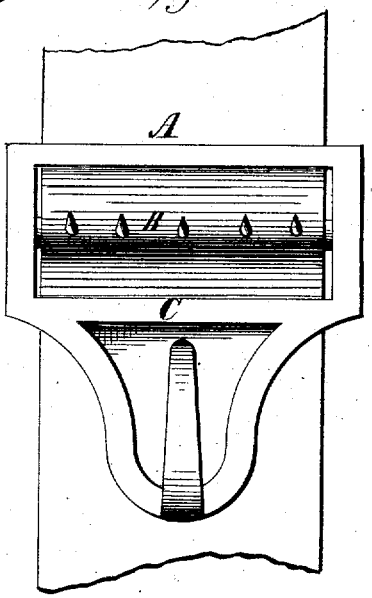

In addition to the advantages above named, by dispensing with the bar C, Fig. 3, we may construct the hook and the tooth-bar so close together as to merely have space between them to allow the chain to be hooked in easily, and when the back-band is put in the buckle it closes at least a portion of this space and thus serves to hold the chain in and to prevent the chain of the horse working alongside from catching on the hook.

The advantage of this arrangement may be seen by referring to Fig. 3, which illustrates the forms heretofore in use.

It will be seen that the space left between the hook and the buckle for hooking on the chain is left full open in use, not being diminished by the band when it is put in, and hence the chain may sometimes escape from the hook or the chain of the horse working alongside catch on the hook, and thus give trouble.

If the form shown in Fig. 2 be used, the bar B may be of wire and clasped at its ends about A, or it may be cast with teeth on it and with eyes in its ends for A to pass through, or the whole may be cast as desired; also, the wire A may be continuous at the top, the ends meeting on the point of the hook.

What I claim is—

1. A combined double-loop buckle and hook for back-bands and similar uses, constructed of two wires, bent into the form and connected in the manner herein shown and described.

2. A combined hook and buckle for back-bands and similar uses, in which the hook-bar performs also the function of loop for the end of the band, substantially as herein shown and described.

3. A buckle for back-bands and similar uses, constructed with a central section of the upper parallel bar or loop omitted, substantially as herein shown and described.

4. A combined hook and buckle for back-bands and similar uses, constructed with the hook-bar and tooth-bar in juxtaposition and the point of the hook in the same plane with or close proximity to the tooth-bar, substantially as and for the purpose herein shown and described.

Witness my hand this 20th day of October, 1877.

JOSIAH B. GATHRIGHT.

Witnesses:
R. M. DENNIS,
JOHN J. HARBISON.